United States Patent [19]

Schmidt

[11] 3,774,975

[45] Nov. 27, 1973

[54] BRAKE SYSTEM FOR THE TRAILER OF A TRACTOR-TRAILER COMBINATION

[75] Inventor: Herbert Schmidt, Frankfurt-Unterliederbach, Germany

[73] Assignee: ITT Industries, Inc., New York, N.Y.

[22] Filed: Jan. 11, 1972

[21] Appl. No.: 216,995

[52] U.S. Cl. .................................................. 303/7
[51] Int. Cl. .................................................. A46d 1/04
[58] Field of Search ........................................ 303/7

[56] References Cited
UNITED STATES PATENTS

| | | | |
|---|---|---|---|
| 3,620,577 | 11/1971 | Neisch et al. | 303/7 |
| 3,545,815 | 12/1970 | Berg | 303/7 |
| 3,424,502 | 1/1969 | Biaband | 303/7 |
| 3,415,579 | 12/1968 | Biaband | 303/7 |

*Primary Examiner*—Lloyd L. King
*Attorney*—C. Cornell Remsen, Jr. et al.

[57] ABSTRACT

A brake system for the trailer of a tractor-trailer combination is controlled by a driver in combination with the continuous brake and friction (service) brake of the tractor. The inventive brake system includes a friction brake system including known components connected to a hydrodynamic brake including known components, said hydrodynamic system being controlled by the pressure medium (compressed air) tank of said friction brake system when the hydrodynamic system is actuated through means of a driver controlled solenoid valve. The hydrodynamic brake system will be used for continuous braking (down hill braking) and, thus, the wear of the friction brakes of said friction brake system will be reduced, since said friction brake system will be resting, when said hydrodynamic brake system is actuated, but prepared to provide an additional braking for stopping when required. Operation of the friction brake system for said additional braking will deactivate said hydrodynamic brake system. According to a second embodiment disclosed the hydrodynamic brake system can be used as an additional service brake to assist the friction brake system.

12 Claims, 2 Drawing Figures

BRAKE SYSTEM FOR THE TRAILER OF A TRACTOR-TRAILER COMBINATION

BACKGROUND OF THE INVENTION

The invention relates to a brake system for the trailer of a tractor-trailer combination, said brake system being controlled by a driver in combination with the continuous brake and service brake of the tractor or engine-equipped truck.

The term "tractor-trailer combination" as employed herein refers to an engine equipped truck or tractor and a trailer having road wheels on both front and rear axles towed or pulled by the tractor through means of a mechanical linkage or connection therebetween, or an engine equipped truck or tractor and a semi-trailer having road wheels on only the rear axle, said semi-trailer being mechanically connected to said tractor by a so called "fifth wheel."

Up to now the trailers of tractor-trailer combinations have been equipped with a friction brake system which pneumatically actuate the friction brakes provided at the wheels of the trailer, said system further being connected to the brake system of the tractor or its actuation mechanism. These trailer friction brakes are always applied upon the actuation of the service brake or of the engine compression brake of the tractor. The trailer friction brakes must, therefore, also act as a continuous brake for the trailer during down-hill driving. This effect has several disadvantages.

In order to have the friction brakes of the trailer operate as continuous brake the friction surfaces must be considerably enlarged in relation to the normal friction brakes installed in the tractor. Thus, space actually needed for the spring suspension of the trailer is occupied and the weight of the brake and, hence, of the unsprung mass at the wheel will increase to an extent which cannot be neglected. In order to avoid an overheating of the friction brakes during a continued braking the permissible velocity for tractor-trailer combinations had to be strictly limited to about 30 km/hr (kilometer/hour) during down-hill driving. Further the braking force of the friction brakes of the trailer cannot be varied during a continued braking. Upon actuation of the engine compression brake of the tractor, a solenoid valve ensures the supply of a constant reduced pressure between 1 and 2 kg/cm$^2$ (kilograms/square centimeter) to the wheel brake cylinders from an extra compressed-air tank provided in the trailer. This constant pressure is adjustable at the solenoid valve. Under special circumstances, however, an overstrain and overheating of the friction brakes occurring, there has been the case that the driver inadvertently switched off the whole continuous-brake system of the trailer by means of an actuating lever provided for the unhooking of the trailer. This resulted in the tractor-trailer combination being braked only by means of the engine compression brake installed in the tractor.

From the above there results the fact that the friction brakes of the trailers and in particular the linings are strained a lot, a replacement of linings often becoming necessary after only a few thousand kilometers of being in use. This proves very disadvantageous for total costs.

SUMMARY OF THE INVENTION

It is an object of the present invention to eliminate these abovementioned disadvantages and to provide a brake system for the trailer of a tractor-trailer combination which ensures a relief of the friction brakes — especially during continued braking — and, hence, a longer life for the expensive friction brakes. Moreover, the effect of the continuous brake is to be variable and is to be adaptable to the loaded or unloaded condition of the trailer.

A brake system for the trailer of a tractor-trailer combination controlled by a driver in combination with a service (friction) brake and a continuous brake installed in the tractor of the tractor-trailer combination comprising a friction brake system; and a hydrodynamic brake system including a hydrodynamic brake, a loading cylinder coupled to the hydrodynamic brake, a first compressed air tank, and a relay valve coupled between the loading system and the first tank, the relay valve being coupled to the friction brake system and being controlled by a unit of the friction brake system.

Another feature of the present invention is that the relay valve is controllable from the normally existing compressed-air tank of the friction brake system via a solenoid valve.

Another feature of the present invention is that the solenoid valve has an exciter circuit which is closed upon the actuation of the continuous brake installed in the tractor and which is interrupted by means of a pressure-medium-operated switch connected in the trailer friction brake system upon actuation of the trailer friction brake system.

Still another feature of the present invention is to connect an axle-load-dependent brake force distributor between the solenoid valve and the relay valve.

According to a further feature of the present invention the compressed-air tank of the hydrodynamic brake system is connected with the compressed-air tank of the friction brake system by means of an overflow valve.

According to still a further feature of the present invention the pressure medium line connected to the friction brakes of at least the rear axle are provided with a normally closed pressure retaining valve which is actuable in dependence on a pressure difference generated in said retaining valve.

A further feature of the present invention includes a solenoid valve designed as 4/2-way valve connected between the hydrodynamic brake system and the friction brakes of at least the rear axle. The solenoid valve includes a first connection connected to the pressure medium line of the friction brake system for control of the solenoid valve, a second connection connected to the compressed-air tank of the hydrodynamic brake system, a third connection connected to a two way valve and a pressure reducing valve connected to control the axle-load-dependent brake force distributor, a fourth connection connected to the pressure retaining valve of the friction brakes of at least the rear axle for the generation of the retaining pressure, and a fifth connection connected to a control valve connected in rear axle pressure medium line and to the pressure retaining valve for the reduction of the brake pressure in the friction brakes. When the trailer has friction brakes for both front and rear axles, a second pressure retaining valve is also provided which is directly connected into the front axle pressure medium line and to the fifth connection of the solenoid valve.

The pressure retaining valve or valves operate with a retaining pressure of 3 kg/cm$^2$.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENTS

Figure 1:
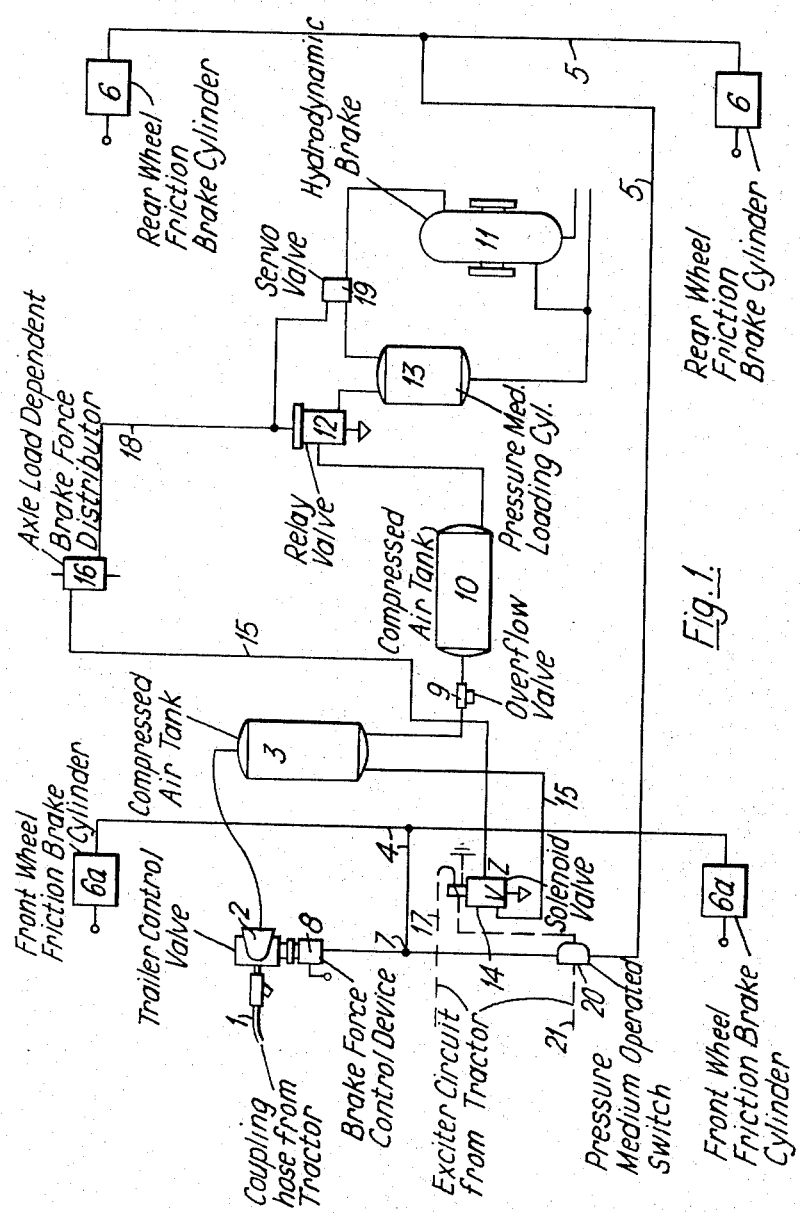
FIG. 1 shows the inventive brake system disposed in the trailer of a truck-trailer combination.

FIG. 1 discloses the friction brake system of a trailer which up to now has been in common use and which in the inventive brake system cannot be entirely dispensed with and which will be changed very slightly, only. The coupling hose 1 leads from the tractor (not shown) to the trailer control valve 2 which by means of its first switching position the compressed-air tank 3 is charged by the compressor installed in the tractor and which by means of its second switching position upon actuation of the service brakes in the tractor the wheel cylinders 6 and 6a of the friction brakes connected by means of the pressure medium lines 4 and 5 are supplied with pressure from the compressed-air tank 3. This latter statement of operation is true for a trailer having friction brakes at both front and rear axles. However, for a semi-trailer (friction brakes at only the rear axle) cylinders 6a and pressure medium lines 4 would be omitted. In the pressure medium line, between its bifurcation 7 leading to the wheel brake cylinders 6 and 6a of the front and rear axles and the trailer control valve 2, a brake force control device 8 is connected in a manner known per se. Brake force control device 8 makes the pressure which becomes effective variable by means of the force applied by the driver. Brake force control device 8, however, only becoming effective upon actuation of the service brakes of the trailer. In the inventive system, that part of the brake system described up to now and known per se is to become effective as a service brake, only. Its effect as a continuous brake is to be eliminated.

For the purpose of a continued braking, the system just described is supplemented by a hydrodynamic brake system. The compressed-air tank 3, therefore, is connected with a second compressed-air tank 10 by way of an overflow valve 9, said second compressed-air tank 10 also being supplied with pressure from the compressor of the tractor via the compressed-air tank 3, the pressure being required for the actuation of the hydrodynamic brake 11. The overflow valve 9 ensures that the pressure in the compressed-air tank 3 does not drop below a determined level, thus, the readiness of the friction brakes 6 and 6a to act as service brakes even after a prolonged continuous braking is safeguarded. The compressed-air tank 10 is followed by a relay valve 12 by means of which the supply and pressure of the pressure medium from the compressed-air tank 10 to the following pressure-medium filled loading cylinder 13 may be controlled. The loading cylinder 13 itself is connected with the interior of the hydrodynamic brake 11.

The solenoid valve 14 existing in the usual trailer brake systems which is operable simultaneously with the engine compression brake of the tractor is also used in the inventive system but it is connected in another way. While in the known systems as referred to above said valve effected an application of the wheel cylinders 6 and 6a of the friction brakes with pressure from the compressed-air tank 3, in the inventive system the solenoid valve 14 is connected in a pressure medium line 15 between the compressed-air tank 3 and an axle-load-dependent brake force distributor 16 which controls the relay valve 12. In this arrangement the exciter circuit 17 and 21 of the solenoid valve 14 is also fed with current from the tractor upon actuation of the engine compression brake. A servo valve 19 connected with the loading cylinder 13, the interior of the hydrodynamic brake 11 and with the control line 18 of the relay valve 12 leading from the axle-load-dependent brake force distributor 16 ensures a pressure compensation. A pressure-medium-operated switch 20 is connected in the pressure medium lines 4 and 5 leading from the trailer control valve 2 to the wheel brake cylinders 6 of the rear axle or the wheel brake cylinders 6a of the front axle. Switch 20 is further connected in the exciter circuit 17 and 21 for the solenoid valve 14. In the rest position of the system switch 20 is closed. It will open when — upon actuation of the service brake — it is applied with a predetermined minimum pressure. Thus, it will prevent a simultaneous actuation of the service and continuous brakes of the trailer, i.e., it will prevent an overbraking of the trailer.

The driver of the tractor-trailer combination wanting to initiate a continued braking will operate the continuous brake of the tractor, i.e., the engine compression brake, as he has always done. By this action, simultaneously, solenoid valve 14 will be actuated, compressed-air tank 3 will be connected with the axle-load-dependent brake force distributor 16 which on its part controls the relay valve 12 via the control line 18 in accordance with the loading condition of the trailer. Thereby, there is avoided an overbraking of the trailer wheels during a continued braking when the trailer is empty. Now the hydraulic liquid or pressure medium of the loading cylinder 13 will be supplied with pressure from the compressed-air tank 10 through relay valve 12 to a more or less great extent, i.e., in accordance with the degree of opening of relay valve 12 and with the axle load, respectively, the hydraulic liquid being displaced into the interior of the hydrodynamic brake 11 in a manner known per se. In this manner a braking torque is generated which acts on the rotor which is connected with an axle of the trailer, such as the rear axle. The cooling and evacuation of the hydrodynamic brake 11 is effected in a manner known per se and does not belong to the subject matter of the present invention.

During this continued braking the friction brakes of the trailer are not used at all and remain in reserve in case an additional braking will become necessary which will cause the tractor-trailer combination to halt.

Figure 2:
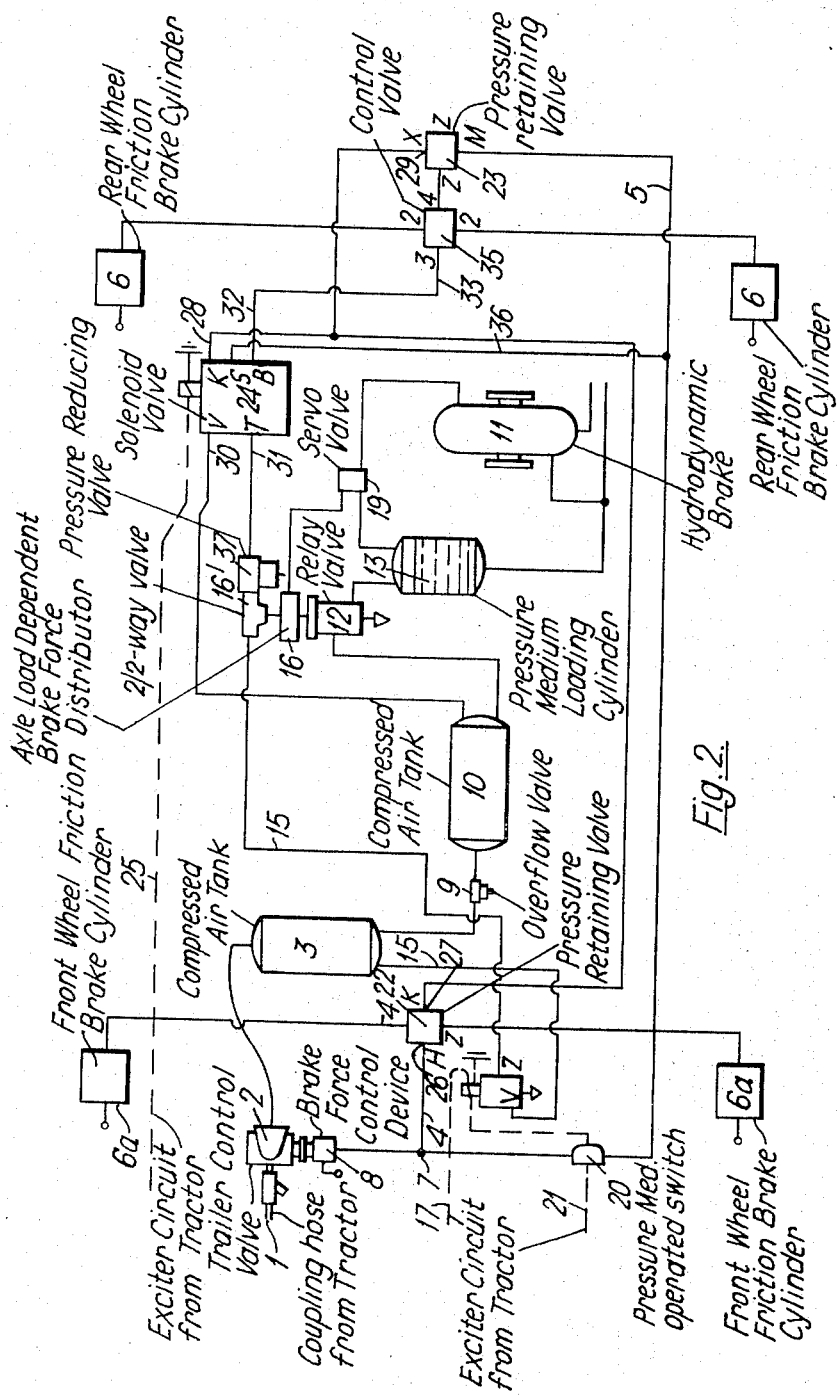
FIG. 2 shows a second embodiment of the invention.

In order to relieve and protect the friction brakes during braking to achieve a normal stopping of the tractor-trailer combination the embodiment of FIG. 2 may be employed.

The brake system of the trailer according to FIG. 2 is designed like the one described with reference to FIG. 1. The actuation of the hydrodynamic brake 11 as continuous brake also is effected in the way heretofore described in connection with FIG. 1. It is, however, possible to use the hydrodynamic brake as an additional primary or service brake.

For this purpose the system has been expanded to the extent that a pressure retaining valve 22 and 23 are connected in the brake lines 4 and 5, respectively, leading to the wheel brake cylinders 6 and 6a of the front and rear axles. It should be remembered, however, that if the trailer is a semi-trailer having only a rear axle, valve 22, brake line 4 and cylinders 6a will be omitted. The pressure retaining valve 22 disposed at the front axle has two connections for the pressure medium lines to the wheel brake cylinders 6a of this axle, a third connection 26 connected to the main brake line leading from the brake force control device 8 and a fourth connection 27 communicating with the connection 28 of the second solenoid valve 24. The connection 29 of the pressure retaining valve 23 in the pressure medium line 5 for the wheel brake cylinders 6 of the rear axle is also connected to the pressure medium line between connection 28 of the solenoid valve 24 and connection 27 of the pressure retaining valve 22. The solenoid valve 24 is supplied by its own exciter circuit 25, which is closed upon actuation of the service brake of the tractor, and is designed as 4/2-way valve. Connection or input 30 of valve 24 is directly connected with the compressed-air tank 10 while the other connection or input 31 is connected with the solenoid valve 14 via a pressure reducing valve 37 and a 2/2-way valve 16'. One connection of the 2/2-way valve 16' is connected to at the axle-load-dependent brake force distributor 16 which on its part communicates with the relay valve 12 and the servo valve 19 of the hydrodynamic brake. The connection 28 of the solenoid valve 24 communicating with the two pressure retaining valves 22 and 23 conveys the pressure of the compressed-air tank 10 when the solenoid valve 24 is opened.

The solenoid valve 24 normally separates the two brake circuits of the hydrodynamic brake 11 and of the friction brakes 6 and 6a. The connection or output 32 of the solenoid valve 24, which in open position of the solenoid valve 24, is communicating with the connection 31 connected to the pressure reducing valve 37 and the connection 33 of a control valve 35, the second connection of valve 35 being connected to the output or connection 34 of the pressure retaining valve 23. Furthermore the control valve 35 has two additional connections for the pressure medium lines leading to the wheel brake cylinders 6 of the rear axle. A pressure medium line 36 branching off from the pressure medium line 5 connected to the brake force control device 8 controls the solenoid valve 24.

The pressure retaining valves 22 and 23 operate with retaining pressure and are normally closed. Upon actuation of the service brake by the driver in the tractor the friction brakes at the front and rear axles of the trailer at first will not respond since the pressure retaining valves 22 and 23 effect a hold-up of the pressure up to a pressure of 3 kg/cm². The solenoid valve 24 designed as 4/2-way valve, the exciter circuit 25 of which has been closed upon actuation of the service brake, will respond to a pressure of about 0.2 kg/cm². Thus, a pressure is building up from the compressed-air tank 10 via the connections 30 and 28 to the pressure retaining valves 22 and 23 which effects the retaining operation of the pressure retaining valves 22 and 23. A further pressure builds up from the connection 32 of the solenoid valve 24 to the control valve 35 which leads to the result that the operating pressure at the rear axle can attain but half the value of the operating pressure of the front axle. Thus, an overbraking of the rear axle upon future additional response of the service brake has been avoided.

Finally, a control pressure is building up from the connection 31 of the solenoid valve 24 to the pressure reducing valve 37 via the 2/2-way valve 16' and the axle-load-dependent brake force distributor 16 in accordance with the pressure applied by the brake force control device 8. Said control pressure controls the relay valve 12 which opens in accordance with the loading condition of the trailer such that the pressure medium in the loading cylinder 13 is applied with pressure by the compressed air from the compressed-air tank 10 and is delivered into the interior of the hydrodynamic brake 11 which thus will become effective as service brake.

The control pressure in the lines from brake force control device 8 increasing by means of further pressing-down of the brake pedal in the tractor exceeding 3 kg/cm² surpasses the retaining pressure in the pressure retaining valves 22 and 23 and the friction brakes at the front and rear axles will respond. The pressure in the loading cylinder 13 will then be the maximum control pressure of 3.5 kg/cm². Now there will be an additional braking effected by the friction brakes which increases in proportion to the increasing pedal force.

A pressure of about 5 kg/cm² existing in the control lines coming from brake force control device 8 will neutralize the retaining effect of the service brake, i.e., from this pressure on there results the same position of the pedal as in the case of an application without pressure retaining valves.

The pedal control of the hydrodynamic brake as a service brake can be switched off by means of a tumbler switch (not shown in the drawing) connected in the exciter circuit of the solenoid valve 24 which then will be without current, the lines leading to the pressure retaining valves 22 and 23 and to the control valve 35 being evacuated. Thus, the pressure reduction in the proportion of 2 : 1 at the rear axle and the pressure retaining effect at the front and rear axles are neutralized. The distances of travel of the brake pedal and operation of brake force control device 8 then will be the same as in a vehicle without a hydrodynamic brake.

This invention ensures a considerable protection of the friction brakes of the trailer which may be dimensioned smaller than up to now due to the fact that they need not act as a continuous brake.

This involves a gain in space for devices, such as for the suspension of the trailer. Furthermore, quite a large part of the additional weight due to the arrangement of the hydrodynamic brake will then be capable of being compensated for. The hydrodynamic brake is far more suitable for continued brakings than the friction brakes, the wear will be reduced, and there will always remain sufficient braking force for braking to achieve a stopping of the tractor-trailer combination during a continued braking.

A special advantage of the invention is the fact that the traditional trailer brake system need not be changed as it is only expanded by some components which may be easily added to any existing trailer brake system.

While I have described above the principles of my invention in connection with specific apparatus it is to be more clearly understood that this description is made only by way of example and not as a limitation to the

I claim:

1. A brake system for the trailer of a tractor-trailer combination controlled by a driver in combination with a service brake and a continuous brake installed in said tractor of said tractor-trailer combination, said trailer brake system comprising:
   a friction brake system; and
   a hydrodynamic brake system including
      a hydrodynamic brake,
      a loading cylinder coupled to said hydrodynamic brake,
      a first compressed air tank, and
      a relay valve coupled between said loading cylinder and said first tank,
      said relay valve being coupled to said friction brake system and being controlled by a unit of said friction brake system.

2. A brake system according to claim 1, wherein said unit includes
   a second compressed air tank normally employed in said friction brake system; and
   said hydrodynamic brake system further includes
      a first solenoid valve coupled between said second tank and said relay valve to enable the compressed air of said second tank to control said relay valve.

3. A brake system according to claim 2, wherein said first solenoid valve includes
   an exciter circuit connected to said tractor, said exciter circuit being closed upon actuation of said continuous brake of said tractor by said driver, and
   said friction brake system further includes
      a pressure medium operated switch coupled to said exciter circuit and to a brake pressure medium line of said friction brake system, said exciter circuit being interrupted by said pressure medium operated switch upon actuation of said friction brake system.

4. A brake system according to claim 2, wherein said hydrodynamic brake system further includes
   an axle-load-dependent brake force distributor coupled between said solenoid valve and said relay valve.

5. A brake system according to claim 2, wherein said hydrodynamic brake system further includes
   an overflow valve coupled between said first and second tanks.

6. A brake system according to claim 2, wherein said first solenoid valve includes
   a first exciter circuit connected to said tractor,
   said first exciter circuit being closed upon actuation of said continuous brake of said tractor by said driver;
   said friction brake system further includes
      a pressure medium operated switch coupled to said exciter circuit and to a brake pressure medium line of said friction brake system, said exciter circuit being interrupted by said pressure medium operated switch upon actuation of said friction brake system; and
   said hydrodynamic brake system further including
      an axle-load-dependent brake force distributor coupled between said solenoid valve and said relay valve, and
      an overflow valve coupled between said first and second tanks.

7. A brake system according to claim 6, wherein said friction brake system further includes
   friction brakes for the wheels of at least the rear axle of said trailer,
   a rear axle pressure medium line connected to said friction brakes, and
   a pressure retaining valve coupled to said rear axle pressure medium line,
   said pressure retaining valve being normally closed and actuated by a pressure difference generated in said pressure retaining valve.

8. A brake system according to claim 7, further including
   a two-way valve connected between said first solenoid valve and said axle-load-dependent brake force distributor,
   a pressure reducing valve connected to said two-way valve,
   a control valve connected in said rear axle pressure medium line and connected to said pressure retaining valve,
   a second solenoid valve configured to be a 4/2-way valve having a first connection connected to the pressure medium line of said friction brake system for control of said second solenoid valve, a second connection connected to said first tank, a third connection connected to said pressure reducing valve, a fourth connection connected to said pressure retaining valve for the generation of a retaining pressure and a fifth connection connected to said control valve for reduction of brake pressure in said friction brakes, and
   a second exciter circuit connected between said tractor and said second solenoid valve.

9. A brake system according to claim 8, wherein said pressure retaining valve operates with a retaining pressure of 3 kilograms per source centimeters.

10. A brake system according to claim 6, wherein said friction brake system further includes
   first friction brakes for the wheels of the rear axle of said trailer,
   second friction brakes for the wheels of the front axle of said trailer,
   a rear axle pressure medium line connected to said first friction brakes,
   a front axle pressure medium line connected to said second friction brakes,
   a first pressure retaining valve coupled to said rear axle pressure medium line, and
   a second pressure retaining valve connected directly in said front axle pressure medium line,
   both said first and second retaining valves being normally closed and actuated by a pressure difference generated in said first and second retaining valves.

11. A brake system according to claim 10, further including
   a two-way valve connected between said first solenoid valve and said axle-load-dependent brake force distributor,
   a pressure reducing valve connected to said two-way valve,
   a control valve connected in said rear axle pressure medium line and connected to said first pressure retaining valve, a second solenoid valve configured to be a 4/2-way valve having a first connection connected to the pressure medium line of said friction brake system for control of said second solenoid valve, a second connection connected to said first tank, a third connection connected to said pressure reducing valve, a fourth connection connected to both of said first and second pressure retaining valves for the generation of a retaining pressure and a fifth connection connected to said control valve for reduction of brake pressure in said first friction brakes, and a second exciter circuit connected between said tractor and said second solenoid valve.

12. A brake system according to claim 11, wherein both of said first and second pressure retaining valves operate with a retaining pressure of 3 kilograms per square centimeters.

* * * * *

UNITED STATES PATENT OFFICE
CERTIFICATE OF CORRECTION

Patent No. 3,774,975    Dated November 27, 1973

Inventor(s) Herbert Schmidt

It is certified that error appears in the above-identified patent and that said Letters Patent are hereby corrected as shown below:

On the Front Page between "[21] Appl. No.: 216,995" and "[52] U.S. Cl. 303/7" insert -- [30] Foreign Application Priority Data February 26, 1971 Germany P 2109 137.2--.

Signed and sealed this 23rd day of April 1974.

(SEAL)
Attest:

EDWARD M.FLETCHER,JR.
Attesting Officer

C. MARSHALL DANN
Commissioner of Patents